Patented Jan. 31, 1939

2,145,828

UNITED STATES PATENT OFFICE 2,145,828

SOLVENT REFINING OF MINERAL OIL

Louis A. Clarke, Fishkill, and Edwin C. Knowles, Beacon, N. Y., assignors to The Texas Company, New York, N. Y., a corporation of Delaware No Drawing. Application October 9, 1935, Serial No. 44,254

6 Claims. (Cl. 196—13)

This invention relates to refining mineral oil and more particularly to refining of mineral oil by solvent extraction.

The invention broadly contemplates a process for extracting mineral oil with an extraction solvent in the presence of an added material, whereby the extraction solvent is rendered more effective as regards the removal of certain undesired constituents from the oil undergoing treatment.

More specifically, the invention comprises extracting mineral lubricating oil containing solid and semi-solid asphaltic constituents, and particularly a residual type of oil, with a selective solvent in the presence of an added material having a relatively high ionization constant and adapted to increase the solvent action of the extraction solvent upon the asphaltic constituents of the oil.

The added material may comprise a small amount of either an organic or inorganic acid substance, preferably having an ionization constant of the order of $150 \times 10^{-5}$ ($25°$ C.) or greater. Added materials which have been found particularly suitable are hydrogen chloride, hydrogen bromide, and halo acetic acids, such as mono-, di- and tri-chloracetic acids, and which do not enter into vigorous chemical reaction with the oil to cause sludging, such as is the case with sulphuric acid.

The extraction solvents may comprise dichlorethyl ether, nitrobenzene, phenol and halophenols, such as ortho-chlorphenol, having a relatively high selective action as between naphthenic and paraffinic constituents of the oil. Other selective solvents with which the invention may be advantageously employed comprise mixtures of sulphur dioxide and an auxiliary solvent, such as benzol, and also mixtures, such as phenol or cresol, and a light hydrocarbon, such as propane.

In practicing the invention, the added material may be mixed either with the oil undergoing treatment, or with the extraction solvent prior to mixing the extraction solvent with the oil. The extraction solvent, added material, and oil are subjected to mixing under conditions adapted to bring about efficient contact therebetween, and then permitted to separate into extract and raffinate phases, respectively, rich in low viscosity index and high viscosity index constituents of the oil. These phases are then removed and the solvent liquid recovered therefrom.

It has been found that the addition of a small amount of acidic material to an extraction solvent, such as dichlorethyl ether, for example, apparently increases the solvent action of the solvent for color-forming and residual carbon-forming bodies of the oil so that the resulting raffinate oil is superior to that obtained when extracting with the extraction solvent alone as regards freedom from these objectionable constituents.

This improvement is observed particularly in the case of heavy residual lubricating oil stocks. Heavy mixed base residuum, for example, is usually of distinctly black color and when such oil is extracted with dichlorethyl ether or phenol, in order to segregate therefrom raffinate oil of high viscosity index, the resulting raffinate oil will still retain the black color of the original oil. However, when the same extraction is made in the presence of a small amount of hydrogen chloride or chloracetic acid, the color of the resulting raffinate oil will be green, and in some instances may be of a relatively light shade of green. In addition, there is a very marked reduction in the carbon residue content of the refined oil.

The process of our invention is, therefore, particularly adapted to solvent refining residual lubricating oil fractions, or to lubricating oils containing solid and semi-solid asphaltic constituents. While in the case of distillate oils which are substantially free from these asphaltic constituents, treatment with a selective solvent in the presence of the highly ionizable material does not result in any substantial improvement over treatment with the solvent alone, nevertheless in the case of heavy distillate fractions, which are contaminated with these solid and semi-solid asphaltic constituents, a very substantial improvement in the reduction of residual carbon content is realized by solvent refining in the presence of the added highly ionizable material.

The amount of acidic material to be added will depend upon the nature of the material used, although in general the addition of up to about 10% by volume of the solvent is sufficient. On the other hand, when using a highly ionized substance, such as hydrogen chloride gas, it is usually sufficient merely to saturate the solvent with the gas. In this case, the acid material will comprise less than 1% by volume of the solvent.

It is also contemplated that the acidified extraction solvent, or a mixture of extraction solvent and ionized material, may be used in conjunction with a diluent solvent liquid, such as a light petroleum fraction of the character of propane, butane, pentane, etc. The diluent may comprise any one of these light hydrocarbons, or mixtures thereof, such as occurs in natural gasoline. Somewhat higher boiling fractions, such as gasoline, may also be suitable in certain cases.

By way of illustration, the following examples will be described in which a dewaxed mixed-base residuum, having the characteristics indicated below, was extracted with solvents comprising phenol, and ortho-chlorphenol alone, and in the presence of either hydrogen chloride or chloracetic acid.

In each case, the oil was subjected to two successive extractions at the temperature indicated and using one part of solvent to one part of oil.

Raffinate (a) was obtained by extracting with a solvent composed of 75% phenol and 25% ortho-cresol, Raffinate (b) was obtained by extracting with a solvent composed of 75% phenol and 25% ortho-cresol saturated with hydrogen chloride, Raffinate (c) was obtained by extracting with a solvent composed of 45% ortho-chlorphenol, 45% phenol and 10% chloracetic acid.

|  | Residuum | (a) | (b) | (c) |
|---|---|---|---|---|
| Gravity, A. P. I | 17.8 | 22.7 | 23.1 | 24.2 |
| Saybolt univ. vis.: |  |  |  |  |
| At 100° F | 4400 | 2300 | 1850 | 1600 |
| At 210° F | 159 | 125 | 112 | 101 |
| Viscosity index | 56 | 77 | 79 | 75 |
| Percent carbon res | 6.9 | 4.8 | 3.6 | 2.4 |
| Color | Black | Black | Green | Green |
| Percent yield | 100 | 58 | 60 | 56.9 |
| Extraction temp | 78° F. | 78° F. | 78° F. | 72° F. |

Comparing (a) and (b) above, it will be observed that the raffinate oil obtained when using the acidified solvent was of improved color and slightly higher viscosity index than when using the solvent alone. A slightly higher yield of raffinate oil was also obtained. In addition, the use of the acidified solvent resulted in a reduction of the carbon residue content, namely, 3.6% as compared with 4.8% when using the solvent alone.

In the case of raffinate (c), it will be observed that improved results were obtained when extracting with a mixture of ortho-chlorphenol and phenol in the presence of chloracetic acid, that is, the oil had a carbon residue content of 2.4% and also was green in color.

The following examples afford a comparison of the results obtained when extracting the same residual oil with dichlorethyl ether alone, and with dichlorethyl ether in the presence of hydrogen chloride, and also in the presence of trichloracetic acid. As in the previous case, the oil was subjected to two successive extractions with the solvent at the temperatures indicated, using one part of solvent to one part of oil.

|  | Dichlorethyl ether | Dichlorethyl ether saturated with hydrogen chloride | 90% dichlorethyl ether and 10% trichloracetic acid |
|---|---|---|---|
| Gravity, A. P. I | 21.2 | 23.5 | 24.0 |
| Saybolt univ. vis.: |  |  |  |
| At 100° F | 3400 | 2000 | 1683 |
| At 210° F | 154.5 | 116.5 | 107 |
| Viscosity index | 75 | 78 | 81 |
| Percent carbon res | 5.7 | 3.5 | 2.8 |
| Color | Black | Green | Dark-green |
| Percent yield | 59.0 | 55.3 | 65.1 |
| Extraction temp | 80° F. | 80° F. | 72° F. |

As indicated from the foregoing tabulation, the raffinate oil obtained by extracting the residuum with dichlorethyl ether saturated with hydrogen chloride was of lighter color and of somewhat higher viscosity index than that obtained by using the solvent alone; also, it had a much lower carbon residue content, namely, 3.5% as compared with 5.7% in the case of extracting with the solvent alone. It will be observed that when using the solvent alone, the carbon residue content of the raffinate oil is only slightly lower than that of the original oil which was 6.9%.

The presence of the acid also has the further advantage of facilitating separation between extract and raffinate phases. When extracting the residuum with dichlorethyl ether alone, the separation into the two phases was attended with considerable difficulty due to the formation of an emulsion. On the other hand, it was found that when extracting with the acidified solvent, the presence of acid apparently inhibited the formation of the emulsion, or operated to facilitate its rapid breaking down, and thus greatly facilitating separation into the two phases.

It will also be observed that extracting this residuum with chlorex in the presence of 10% trichloracetic acid gave very satisfactory results in that the carbon residue content of the raffinate oil was even lower than that obtained when extracting with the same solvent saturated with hydrogen chloride. Moreover, a higher yield of higher viscosity index oil was also obtained.

Elimination of emulsion difficulties renders the invention particularly beneficial as applied to the so-called "Duo-sol" refining operation wherein the oil is extracted with a solvent, such as cresol or cresylic acid, in the presence of propane. This type of operation is carried out in a continuous countercurrent tower system and, therefore, reduction in the extent of emulsification is desirable from the standpoint of realizing rapid and efficient separation into phases.

As already indicated, the invention is applicable where a mixture of sulphur dioxide and benzol is used as the extraction solvent. Sulphur dioxide, in the absence of water, does not provide a highly ionizable substance, and in actual solvent-refining operations there is no water present. Consequently, the addition of the ionizable substance of our invention gives improved results with solvent mixtures containing sulphur dioxide.

The process of this invention is applicable to the treatment of lubricating oil stock, either before or after dewaxing. The treatment may be carried out in suitable batch or in continuous countercurrent flow operation.

The proportions of solvent, liquid, as well as the temperatures may vary considerably from those described above in connection with the specific examples, and the particular conditions used will depend to a large extent upon the nature of the oil undergoing treatment as well as on the degree of separation desired.

Obviously, many modifications and variations of the invention, as hereinbefore set forth, may be made without departing from the spirit and scope thereof, and therefore only such limitations should be imposed as are indicated in the appended claims.

We claim:

1. In the manufacture of relatively light-colored lubricating oil of low residual carbon content from a petroleum residue, the steps comprising extracting the residue with a solvent mixture comprising about equal parts of orthochlorphenol and phenol, and containing up to about 10% chloracetic acid by volume of the solvent mixture, forming an extract phase containing low viscosity index constituents together with dark-colored and residual carbon-forming constituents dissolved in the solvent, and a raffinate phase comprising relatively high viscosity index oil substantially free from the undesired constituents, and separating the two phases.

2. In the manufacture of relatively light-colored lubricating oil of low residual carbon content from a petroleum residue, the steps comprising extracting the residue with a solvent mixture comprising orthochlorphenol and phenol in proportions such that the mixture exerts selective action between low and high viscosity index constituents and containing up to about 10% chloracetic acid by volume of the solvent mixture, forming an extract phase containing low viscosity index constituents together with dark-colored and residual carbon-forming constituents dissolved in the solvent, and a raffinate phase comprising relatively high viscosity index oil substantially free from the undesired constituents, and separating the two phases.

3. The method according to claim 1 in which the residue undergoing treatment is diluted with a low-boiling petroleum hydrocarbon.

4. The method according to claim 2 in which the residue undergoing treatment is diluted with a low-boiling petroleum hydrocarbon.

5. In the manufacture of relatively light-colored lubricating oil of low residual carbon content from a petroleum residue, the steps comprising diluting the residue with a low-boiling petroleum hydrocarbon, extracting the mixture with a solvent mixture comprising orthochlorphenol and phenol in proportions such that the mixture exerts selective action between low and high viscosity index constituents and containing a small amount of acid having an ionization constant of the order of $150 \times 10^{-5}$ and above, and which does not enter into vigorous chemical reaction with the oil such that the solvent mixture exerts a high degree of solvent action upon dark-colored and residual carbon-forming constituents of the oil, forming an extract phase containing low viscosity index constituents together with dark-colored and residual carbon-forming constituents dissolved in the solvent and a raffinate phase comprising relatively high viscosity index oil substantially free from the undesired constituents, and separating the two phases.

6. In the manufacture of relatively light-colored lubricating oil of low residual carbon content from a petroleum residue, the steps comprising extracting the residue with a solvent mixture comprising orthochlorphenol and phenol in proportions such that the mixture exerts selective action between low and high viscosity index constituents, and containing up to about 10% of acid having an ionization constant of the order of $150 \times 10^{-5}$ and above, and which does not enter into vigorous chemical reaction with the oil, forming an extract phase containing low viscosity index constituents together with dark-colored and residual carbon-forming constituents dissolved in the solvent, and a raffinate phase comprising relatively high viscosity index oil substantially free from the undesired constituents, and separating the two phases.

LOUIS A. CLARKE.
EDWIN C. KNOWLES.